(12) United States Patent
Mehring et al.

(10) Patent No.: US 11,105,300 B2
(45) Date of Patent: Aug. 31, 2021

(54) CYLINDER SPECIFIC ENGINE COOLING

(71) Applicant: Ford Global Technologies, LLC, Dearborn, MI (US)

(72) Inventors: Jan Mehring, Cologne (DE); Florian Huth, Cologne (DE); Jan Linsel, Cologne (DE); Maziar Khosravi, Cologne (DE); Kai Sebastian Kuhlbach, Bergisch Gladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/856,554

(22) Filed: Apr. 23, 2020

(65) Prior Publication Data

US 2020/0355141 A1    Nov. 12, 2020

(30) Foreign Application Priority Data

May 6, 2019    (DE) .......................... 102019206474.4

(51) Int. Cl.
| | |
|---|---|
| *F02M 25/03* | (2006.01) |
| *F01P 5/12* | (2006.01) |
| *F01P 7/14* | (2006.01) |
| *F02B 75/18* | (2006.01) |
| *F02B 63/06* | (2006.01) |
| *F01P 11/02* | (2006.01) |

(52) U.S. Cl.
CPC .............. *F02M 25/03* (2013.01); *F01P 5/12* (2013.01); *F01P 7/14* (2013.01); *F01P 11/029* (2013.01); *F02B 63/06* (2013.01); *F02B 75/18* (2013.01); *F01P 2007/146* (2013.01)

(58) Field of Classification Search
CPC .... F01P 3/08; F01P 2060/04; F01P 2003/006; F01P 2007/146; F01P 2003/024
See application file for complete search history.

(56) References Cited

U.S. PATENT DOCUMENTS

| | | | | |
|---|---|---|---|---|
| 3,896,774 A | * | 7/1975 | Siewert ..................... | F02B 1/06 |
| | | | | 123/58.8 |
| 2015/0184563 A1 | * | 7/2015 | Yamada ..................... | F01L 1/10 |
| | | | | 123/196 M |
| 2016/0010519 A1 | * | 1/2016 | Hashimoto .............. | F01M 1/02 |
| | | | | 184/6.1 |
| 2016/0305364 A1 | * | 10/2016 | Leone ........................ | F01P 3/08 |
| 2016/0319707 A1 | * | 11/2016 | Nishimoto .............. | F02D 17/02 |

FOREIGN PATENT DOCUMENTS

| | | |
|---|---|---|
| DE | 4029428 A1 | 4/1991 |
| DE | 10059687 A1 | 6/2000 |
| DE | 102013205244 A1 | 9/2014 |
| DE | 102015107078 A1 | 11/2015 |
| DE | 102015009568 A1 | 1/2017 |
| DE | 102016113620 A1 | 1/2018 |
| DE | 102017223127 B3 | 2/2019 |

* cited by examiner

*Primary Examiner* — Long T Tran
(74) *Attorney, Agent, or Firm* — Geoffrey Brumbaugh; McCoy Russell LLP

(57) ABSTRACT

Methods and systems are provided for a cooling system. In one example, a cooling system comprises a device for regulating a coolant flow, where the device is in force-fit connection to a plurality of crankshafts, each crankshaft corresponding to a single cylinder of a plurality of cylinders. The cooling system further comprises a plurality of injectors for injecting coolant onto outer surfaces of the plurality of injectors.

20 Claims, 6 Drawing Sheets

CYLINDER SPECIFIC ENGINE COOLING

CROSS REFERENCE TO RELATED APPLICATIONS

The present application claims priority to German Application No. 102019206474.4 entitled "CYLINDER SPECIFIC ENGINE COOLING" filed on May 6, 2019. The entire contents of the above-listed application are hereby incorporated by reference for all purposes.

FIELD

The present description relates generally to a cooling arrangement for an engine.

BACKGROUND/SUMMARY

Cylinder blocks and heads may be cooled with a pressurized coolant such as a water-glycol mixture or oil. The coolant may flow in a circuit in channels and cavities provided for thermal communication (known as the water jacket). The cooling demand vary depending, amongst others, on the region of the internal combustion engine as at least one example. Thus different regions of a cylinder may be subjected to different thermal loads in the individual strokes of the combustion cycle. Regions with particularly high thermal loading may include the exhaust valve bridges, the intake and exhaust channels, the squish region in the part of the cylinder directed towards the cylinder head, and the region of the cylinder head itself.

As well as the stroke, the load on the internal combustion engine affects the thermal loading of certain regions. The cooling demands here are lower for example in the warmup phase of operation of the internal combustion engine and with cylinders shut down, than in full operation. Therefore, when controlling conventional cooling systems, demands for material strength, knocking behavior, friction and combustion chamber distortion must be balanced. Provision of unnecessary coolant flow causes a corresponding energy demand and hence unnecessarily high fuel consumption.

Therefore, there is a desire to control the cooling of an internal combustion engine as a function of the thermal load.

In one example, the issues described above are at least partially solved by a cooling system for an internal combustion engine with at least one cylinder, comprising a first coolant line having at least one device for regulating the flow of a coolant, which device is in force-fit connection with the crankshaft of the internal combustion engine, and having a spray device for applying a spray jet onto the outer wall of a region of the internal combustion engine.

As one example, crankshafts of the cylinders may dictate to the coolant pump to pump more or less coolant to a control valve, wherein a controller may signal to the control valve to actuate to a position for providing or blocking coolant flow to spray devices of a plurality of spray devices. By doing this, the cooling arrangement may meet each individual cylinders cooling demands. Furthermore, a packaging size of the system is reduced via omission of coolant jackets. That is to say, in one example, the engine is free of coolant jackets. As such, the coolant injection from the plurality of spray devices is the only source of cooling provided by a dedicated thermal management system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
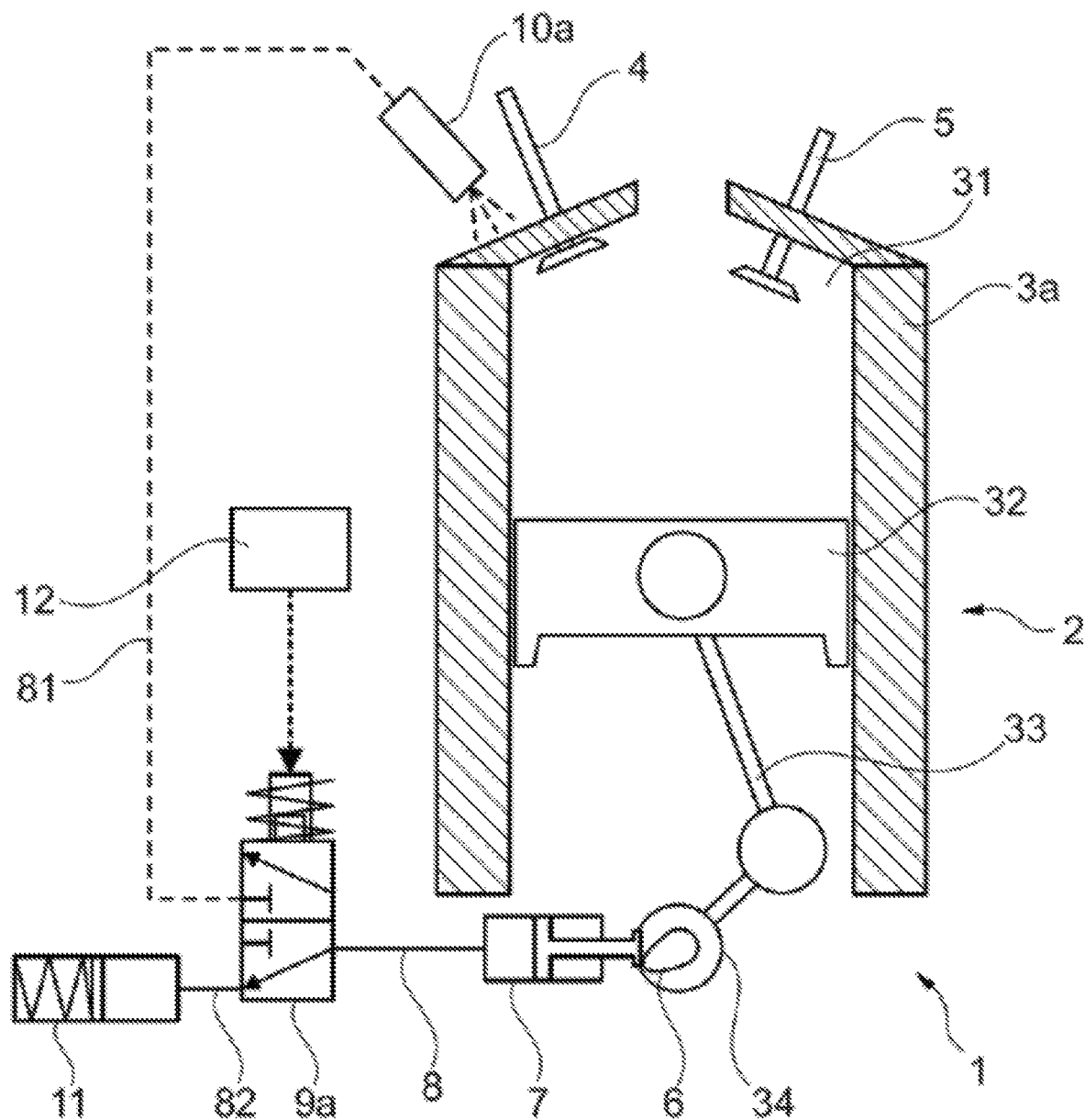
FIG. 1 shows a diagrammatic depiction of an embodiment of the cooling system according to the disclosure.
Figure 2:
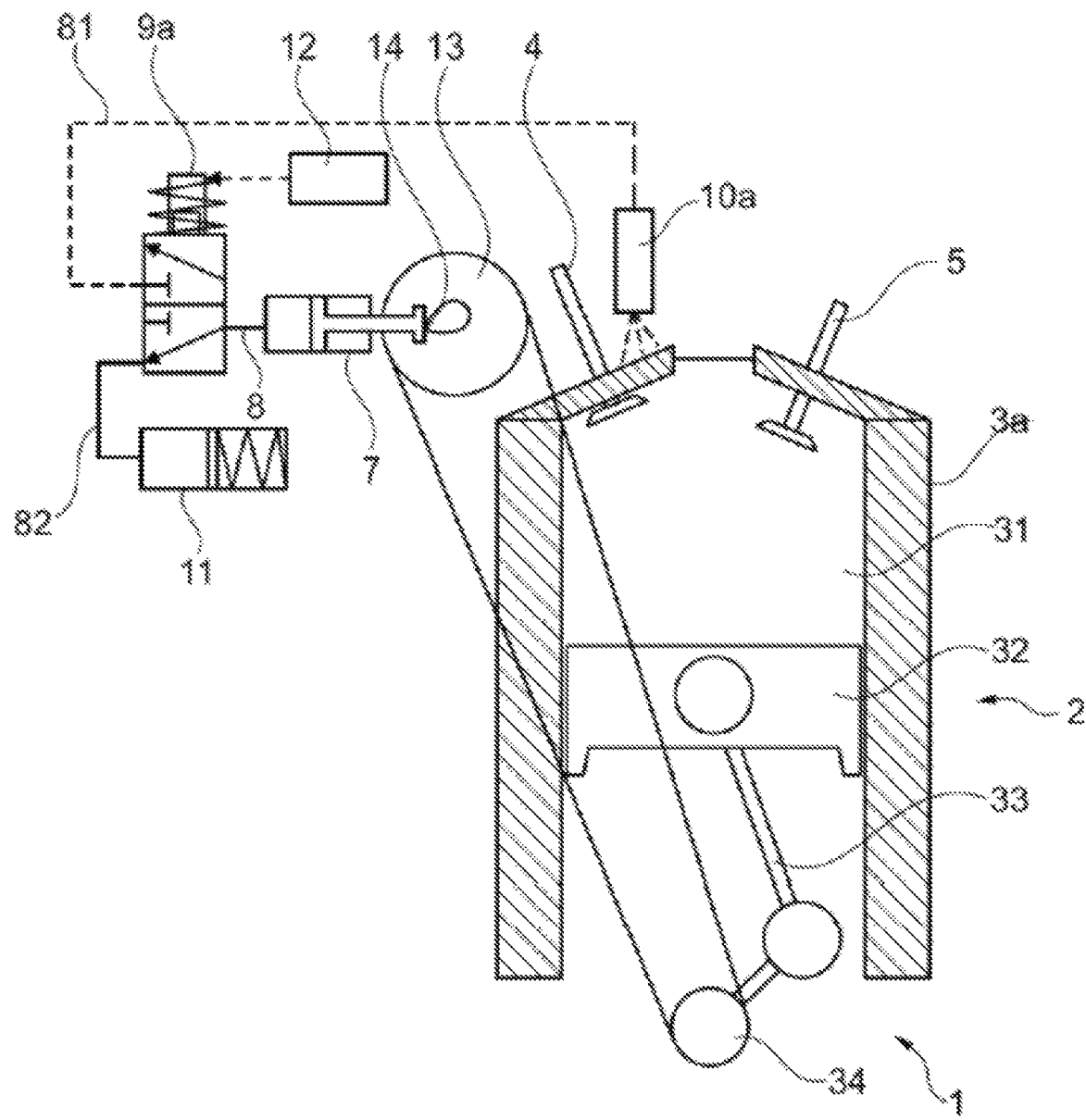
FIG. 2 shows a diagrammatic depiction of an embodiment of the cooling system according to the disclosure.

The following description relates to systems and methods for a cooling system. The cooling system according to the disclosure allows selective cooling of individual cylinders and/or selected regions of an internal combustion engine, as shown in FIG. 1. Here, the points of an internal combustion engine at which cooling is demanded can be cooled. Furthermore, the force-fit connection with the crankshaft advantageously allows cooling matched to crank angle, so that cooling can be provided stroke-dependently for certain regions of an internal combustion engine in which there is a high heat development. Also, the crankshaft-dependent control allows cooling with precise timing. The coolant is advantageously sprayed onto the outer wall in the form of a pulsating impact jet, whereby rapid heat dissipation is possible, as shown in FIG. 2.

In one example, the device for regulating the coolant flow is a coolant pump. The pump may for example be a piston pump or a centrifugal pump. The coolant pump may be actuated directly by the crankshaft, wherein the force-fit connection is achieved by at least one cam arranged on the crankshaft. The crankshaft may also be mechanically connected to a separate camshaft driven by the crankshaft. By controlling the pump, coolant is advantageously pumped into the coolant line when cooling is demanded.

Figure 3:
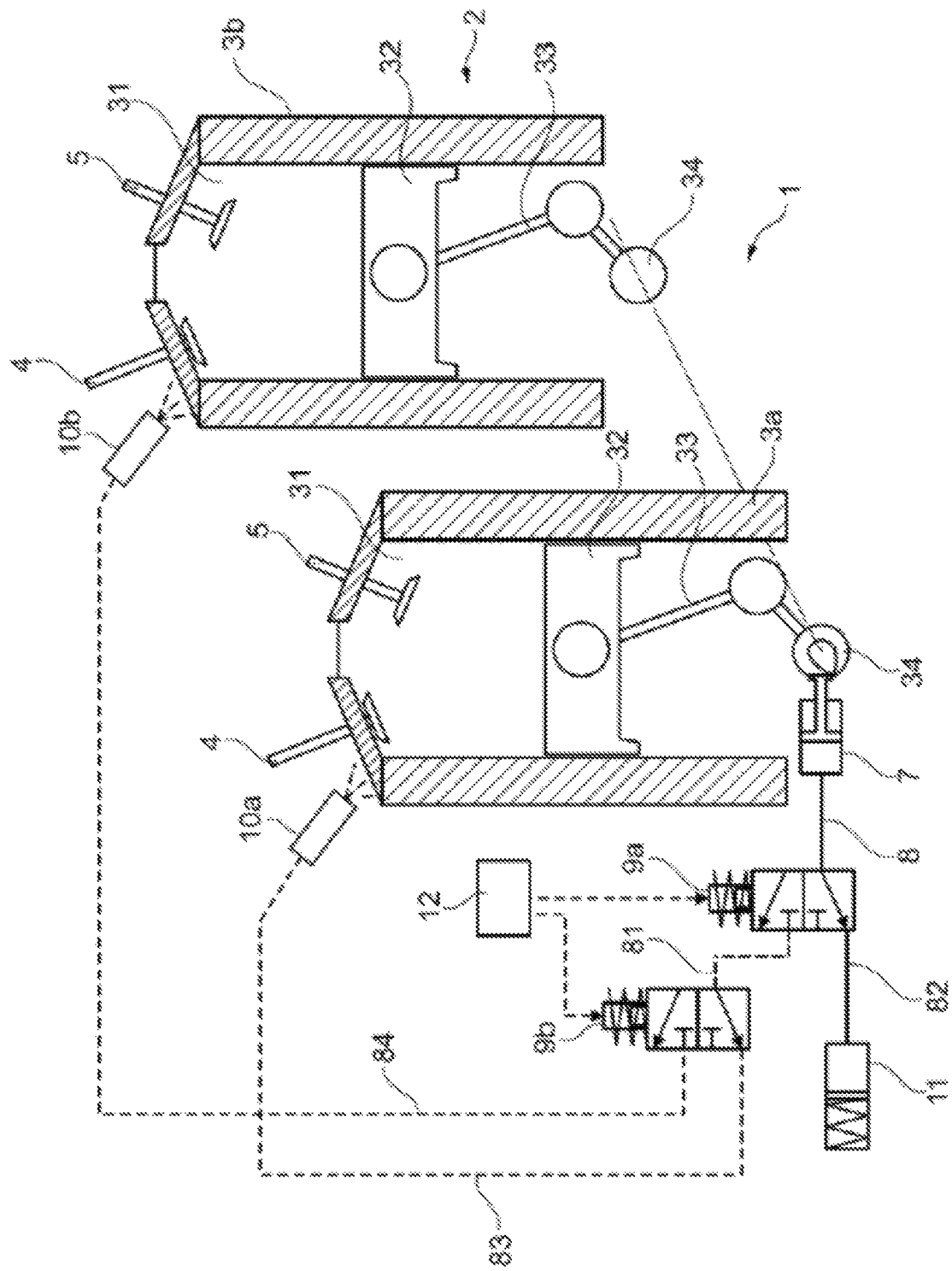
FIG. 3 shows a diagrammatic depiction of an embodiment of the cooling system according to the disclosure.

Furthermore, the device for regulating the coolant flow is a control valve. The control valve, depending on its configuration, may control the coolant flow as a whole and/or control the coolant flow in a specific coolant line. In some examples, the control valve is a directional control valve, e.g. a 3/2-way valve with three ports and two switch positions. The coolant flow may be controlled both by a coolant pump and also by a control valve, so that the two embodiments can be explicitly combined with each other, as shown in FIG. 3. When the control valve is configured as a directional control valve, the control valve is actuated by a control device in order to set different switch positions.

Furthermore, the control device may set the flow rate of the coolant flow by varying the opening degree of the control valve.

Figure 4:
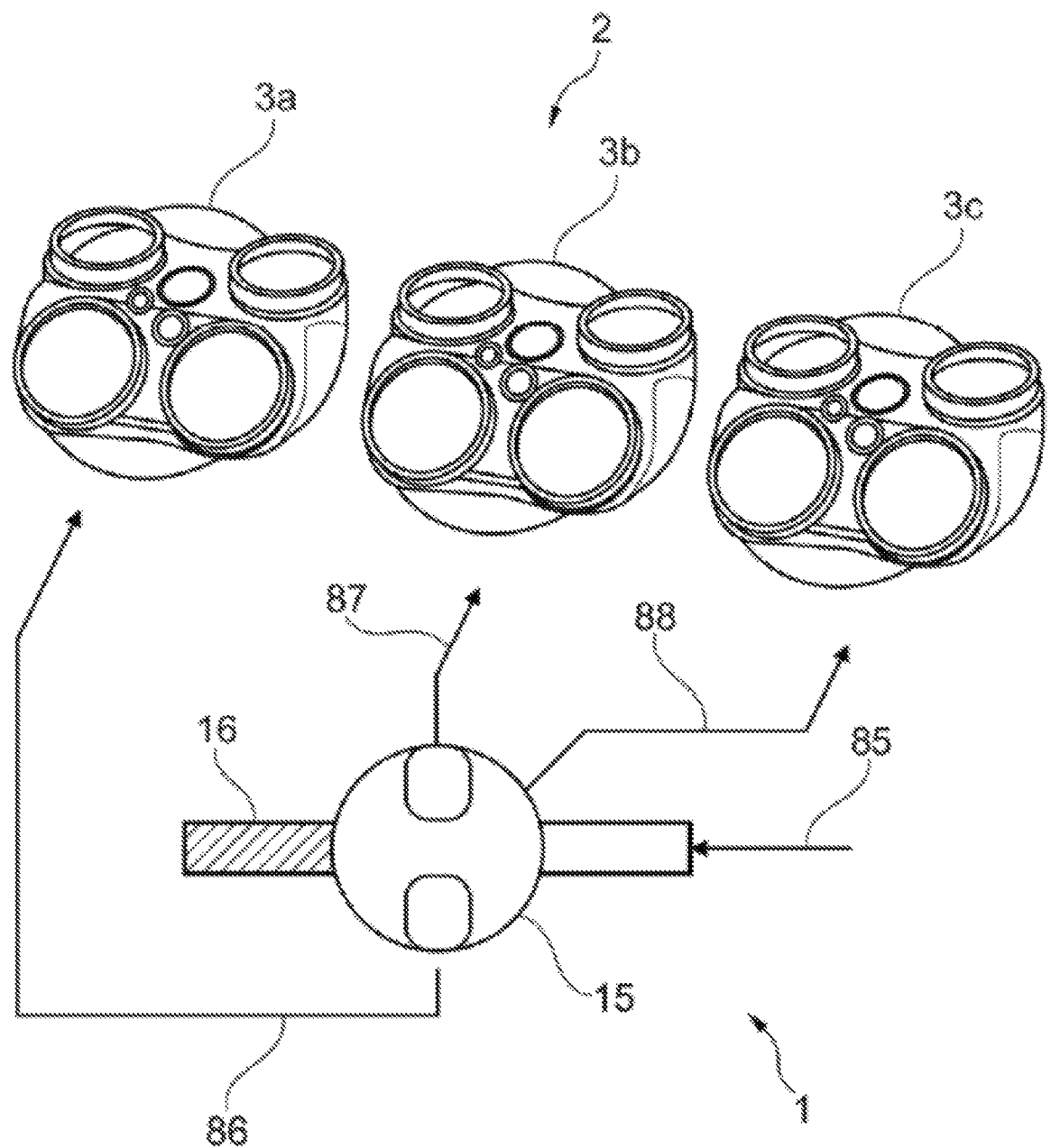
FIG. 4 shows a diagrammatic depiction of an embodiment of the cooling system according to the disclosure.

Furthermore, an embodiment of the cooling system comprises where the cooling system is assigned to an internal combustion engine which has at least a first and a second cylinder, and at least a first directional control valve and a second directional control valve, wherein the first coolant line divides at the first directional control valve into a first partial coolant line leading to the second directional control valve and a second partial coolant line leading to an expansion tank, and the first partial coolant line divides at the second directional control valve into a third partial coolant line assigned to the first cylinder and a fourth partial coolant line assigned to the second cylinder. Here, the internal combustion engine may have further cylinders, wherein the cooling system has further control valves and corresponding further partial coolant lines assigned to the cylinders, as shown in FIG. 4. In this way, the cylinders can advantageously be cooled separately. In a further preferred embodiment, the partial coolant lines are assigned to different regions of one or more cylinders.

In a further embodiment of the cooling system, the control valve is a distribution valve. The distribution valve is actuated by cams of the crankshaft, or of a camshaft connected to the crankshaft, such that coolant is pumped from a pressurized coolant line into the respective partial coolant line of a cylinder which is under particularly high thermal load according to the stroke sequence.

The distribution valve may be a rotary valve. The coolant line divides into the partial coolant lines at the distribution valve. This may allow that, for example, during a combustion stroke when particularly large amounts of heat are produced, more heat is dissipated from the cylinder by forced convection. In some examples, if the cooling system is assigned to an internal combustion engine which has at least a first and a second cylinder, and a pressurized fifth partial coolant line divides at the distribution valve into at least a sixth partial coolant line assigned to the first cylinder and a seventh partial coolant line assigned to the second cylinder.

In one example, the cooling system according to the disclosure is coupled to an internal combustion engine which has been produced by an additive process. Additive processes, also known as three-dimensional printing processes, allow the production of cylinder walls which are thinner than in cast internal combustion machines, e.g. with lattice structures. The cooling system according to the disclosure is particularly suitable for these components because a water jacket may be omitted. Furthermore, heat can be dissipated from the thin-walled structures particularly effectively by spraying coolant onto the outer wall.

Figure 5:
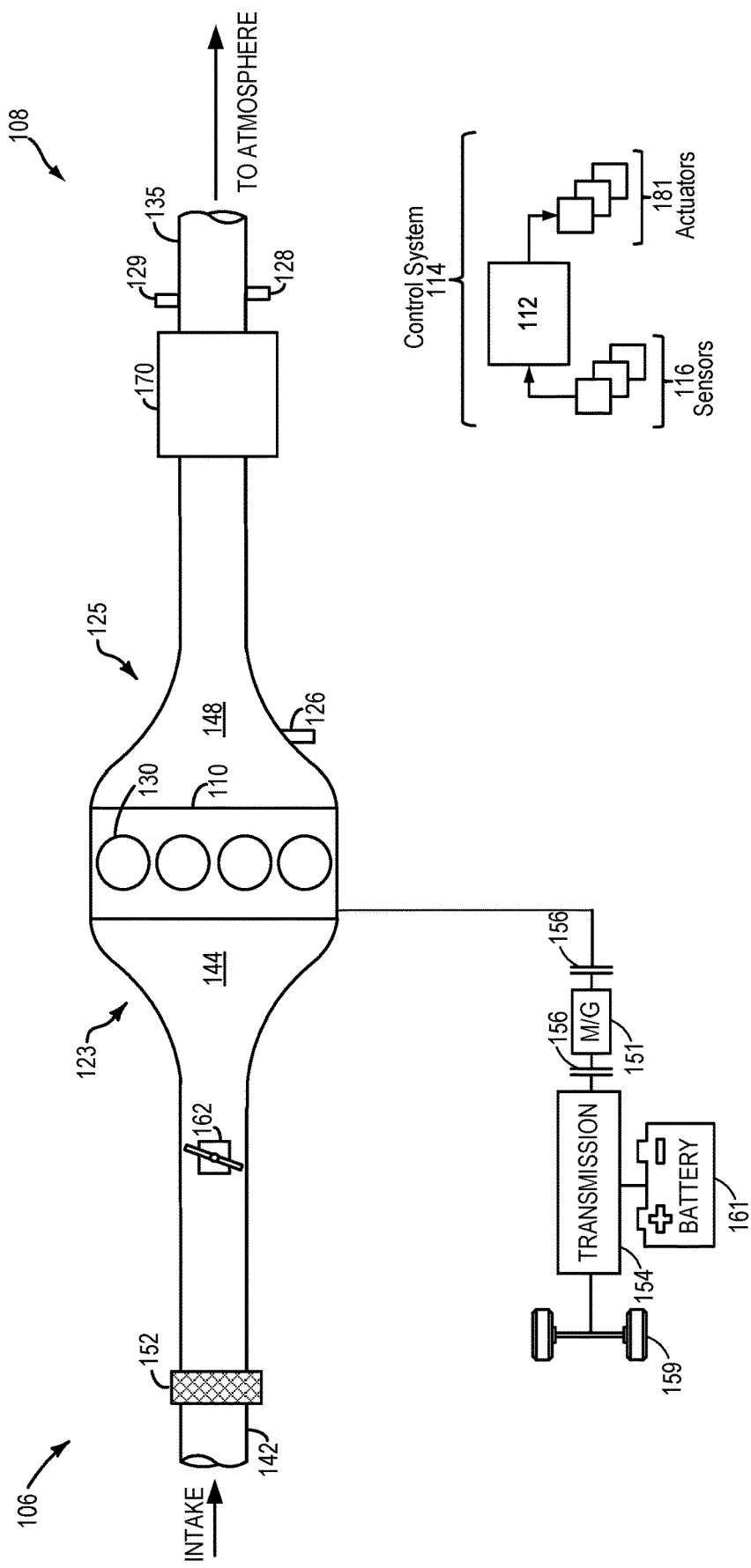
FIG. 5 shows an engine of a hybrid vehicle.

FIG. 5 illustrates a hybrid vehicle comprising the engine of the present disclosure, wherein the engine of the hybrid vehicle utilizes the cooling arrangement of the present disclosure.

A third aspect of the disclosure concerns a method for cooling an internal combustion engine with a cooling system according to the disclosure, wherein at least a valve and/or a coolant pump is actuated as a function of crank angle by cams of the crankshaft of the internal combustion engine and/or of a camshaft connected to the crankshaft, and allows a flow of a coolant to a region of the internal combustion engine to be cooled. The advantages of the method correspond the advantages of the cooling system according to the disclosure.

Preferably, the coolant flow is controlled by crank-angle-dependent actuation of the valves. Here, advantageously, the coolant flow to a specific cylinder and also to a specific region of the cylinder can be controlled. This embodiment is particularly suitable for alternate cooling of different cylinders of a multi-cylinder internal combustion engine.

In some examples, the coolant flow is controlled by a crank-angle-dependent actuation of the coolant pump. Advantageously, the coolant flow to a specific cylinder and/or a specific region of the cylinder can be controlled. This embodiment is particularly suitable for alternate cooling of different selected regions of the cylinder.

FIG. 1 shows an arrangement of a cooling system 1 according to an embodiment of the disclosure with an internal combustion engine 2. The internal combustion engine 2 is a four-stroke, externally (e.g., spark) ignited internal combustion engine, wherein alternatively it may also be self-igniting. The internal combustion engine 2 is produced by an additive process and has a thin-walled material with a robust structure corresponding to requirements, e.g. a lattice structure. The internal combustion engine 2 is shown as an example in FIG. 1 with a first cylinder 3a. The cylinder 3a has a combustion chamber 31. A piston 32 is arranged in the combustion chamber 31 and is moved by the thermal expansion of hot gas produced during combustion of an injected fuel. The movement of the piston 32 is transmitted to a crankshaft 34 via a crank arm 33.

An inlet valve 4 is provided for introducing a defined quantity of combustion air from an intake tract (shown in FIG. 5) into the cylinder 3a. Exhaust gases are extracted from the cylinder 3a via an exhaust gas tract (shown in FIG. 5).

The exhaust valve 5 is provided for expelling exhaust gas from the cylinder 3a.

The crankshaft 34 comprises a cam 6. The cam 6 creates a force-fit connection with a coolant pump 7 on rotation of the crankshaft 34. The coolant pump 7 is connected to a coolant reservoir (not shown) from which coolant is constantly provided to the coolant pump 7. The coolant pump 7 may also be connected to a conventional coolant circuit for the internal combustion engine 2 and further components of the corresponding motor vehicle. The coolant is for example water, water with glycol, or an oil-based fluid e.g. machine oil.

Under the effect of the cam movement, a specific volume of coolant is pumped by the coolant pump 7 to a first control valve 9a via a first coolant line 8. The first control valve 9a is configured as a 3/2-way directional control valve. The control valve 9a accordingly has two switch positions. In the first switch position, the first control valve 9a is connected to a first partial coolant line 81. The first partial coolant line 81 leads to a first spray device 10a. The first spray device 10a points onto the outer wall of the first cylinder 3a in the region of the inlet valve 4. The first spray device 10a is positioned to inject a liquid from the first partial coolant line 81 onto the outer wall of the first cylinder 3a on a side of the inlet valve 4 distal to the exhaust valve 5.

In the second switch position, the first control valve 9 is connected to a second partial coolant line 82. The second partial coolant line 82 is connected to an expansion tank 11. For switching between the switch positions, the first control valve 9a has a magnetic coil. To control the switching, the first control valve 9a is connected to a control device 12 (e.g., a controller).

In a method for cooling the first cylinder 3a, the first control valve 9a is switched into the first switch position according to a control command from the control device 12. On actuation of the coolant pump 7 by the cam 6 of the crankshaft 34, coolant flows to the first spray device 10a which sprays coolant onto the outer wall of the first cylinder 3a in the region of the inlet valve 4. The evaporation of the coolant dissipates heat from the first cylinder 3a.

FIG. 2 shows a further embodiment of the cooling system 1. As such, components previous introduced may be similarly numbered in this figure and subsequent figures. In contrast to the embodiment in FIG. 1, the crankshaft 34 is connected to a camshaft 13. The camshaft 13 is driven by the crankshaft 34 so that the camshaft 13 rotates in synchrony with the crankshaft 34, and via a cam 14 a force-fit connection is created to a coolant pump 7. The cooling process functions in the same way as described for FIG. 1.

The number of cylinders of the internal combustion engine 2 may be equal to two, three, four or more. Each cylinder may be equipped with a cooling system 2. Each iteration of the cooling system 2 may be individually operated in one example, such that cooling of a first cylinder does not affect cooling of a second cylinder different than the first cylinder. The cams 6, 14 may be configured such that the coolant pumps of the individual cooling systems assigned to the cylinders are actuated successively.

Several cylinders may also be supplied by the action of one coolant pump 7. That is to say, some components may overlap across multiple of the cooling system such that packaging constraints are reduced.

In an embodiment according to FIG. 3, a coolant pump 7 is used to supply coolant to the first spray device 10a of the first cylinder 3a and to a second spray device 10b of a second cylinder 3b, in the same region in the vicinity of a respective inlet valve 4. The first control device 9a is connected via the first partial coolant line 81 to a second control device 9b, which is also configured as a 3/2-way directional control valve and controlled by the control device 12. At the second control valve 9b, the first partial coolant line 81 divides into a third partial coolant line 83 and a fourth partial coolant line 84. In the first switch position of the second control valve 9b, coolant is conducted into the third partial coolant line 83, and in the second switch position into a fourth partial coolant line 84, provided that the first control valve 9a is set to the first switch position and the cam 6 of the crankshaft 34 actuates the coolant pump 7.

In a similar fashion to FIG. 2, the crankshaft 34 in FIG. 3 may also be connected to an additional camshaft for driving the coolant pump 7.

Furthermore, an embodiment of the cooling system 2, as an alternative to FIG. 3, may also provide coolant for different regions of the two cylinders 3a, 3b. In a further alternative embodiment of FIG. 3, coolant may also be provided for different regions of just one cylinder 3a or 3b. It is clear that, corresponding to the embodiment with two cylinders, in an internal combustion engine with more than two cylinders, more than two cylinders and/or more than two regions on one or different cylinders may also be cooled via the cooling system 1 according to the disclosure. In one example, this may include a plurality of injectors configured to inject coolant at various regions of the outer walls of the first cylinder 3a and the second cylinder 3b.

In a further embodiment of the cooling system 1 as depicted in FIG. 4, a distribution valve 15 is used, which is configured as a rotary valve, in order to cool the in-line cylinders 3a, 3b, 3c of an internal combustion engine 2. The distribution valve 15 here has a mechanical connection 16 with the crankshaft 34 of the internal combustion engine 2. Additionally or alternatively, the distribution valve 15 may be combined with the embodiment of FIG. 2 such that it comprises a mechanical connection with a camshaft 13 connected to the crankshaft 34. The distribution valve 15 may receive pressurized coolant via a fifth coolant line 85. The distribution valve 15 may be integrated directly in a conventional cooling system of the internal combustion engine, and be arranged upstream or downstream of the internal combustion engine. At the distribution valve 15, the fifth partial coolant line 85 divides into the sixth 86, the seventh 87 and the eighth partial coolant line 88, each of which may be coupled to one or more injectors to inject coolant at the outer surfaces of the first cylinder 3a, the second cylinder 3b, and the third cylinder 3c.

In a method for cooling the internal combustion engine, the distribution valve 15 is driven according to the rotation of the crankshaft 34 or camshaft 13, so that successively coolant is conducted to the spray devices (not shown) at the sixth 86, seventh 87 and eighth partial coolant line 88 leading to the cylinders 3a, 3b, 3c.

Thus, in one example, a cooling system of an internal combustion engine comprising at least two cylinders comprises a coolant line comprising a pump for regulating the flow of a coolant. The pump is in force-fit connection with crankshafts of each cylinder of the internal combustion engine. A control valve is configured to adjust a flow of coolant from the pump to a first spray device of a first cylinder and to a second spray device of a second cylinder. The first spray device is configured to spray coolant onto a first cylinder outer wall and the second spray device is configured to spray coolant onto a second cylinder outer wall. The first spray device is positioned to spray at a region of the first cylinder outer wall adjacent to a first cylinder intake valve, wherein the second spray device is positioned to spray at a region of the second cylinder outer wall adjacent to a first cylinder intake valve.

In one example, control valve is a second control valve downstream of a first control valve relative to a direction of coolant flow, wherein the first control valve is configured to adjust coolant flow to the second control valve or to an expansion tank based on a crank angle of each of the crankshafts. The first control valve and the second control valve are directional control valves comprising three ports and two switch positions.

A first partial coolant line fluidly couples the first control valve to the second control valve, and wherein a second partial coolant line fluidly couples the first control valve to the expansion tank. A first position of the first control valve flows coolant to only the first partial coolant line, wherein a second position of the first control valve flows coolant to only the second partial coolant line. A third partial coolant line fluidly couples the second control valve to the first spray device and a fourth partial coolant line fluidly couples the second control valve to the second spray device. A first position of the second control valve flows coolant to only the third partial coolant line, wherein a second position of the second control valve flows coolant to only the fourth partial coolant line. In one example, the cooling system is configured to control coolant flow to only the internal combustion engine.

In another example, additionally or alternatively, an engine comprises a cooling system, wherein the engine and the cooling system are free of coolant jackets, the engine comprises at least a first cylinder, a second cylinder, and a third cylinder of a plurality of cylinders.

The cooling system comprises a first injector positioned to inject coolant at a first cylinder outer surface, a second injector positioned to inject coolant at a second cylinder outer surface, and a third cylinder positioned to inject coolant at a third cylinder outer surface. The cooling system comprises a coolant pump actuated by and force-fit to at least one crankshaft of the engine. Additionally or alternatively, the cooling system comprises a coolant pump actuated by a camshaft coupled to at least one crankshaft, the coolant pump force-fit to the camshaft. The first injector is positioned to inject coolant adjacent to a first cylinder intake valve, wherein the second injector is positioned to inject coolant adjacent to a second cylinder intake valve, and wherein the third injector is positioned to inject coolant adjacent to a third cylinder intake valve. In one example, a multi-way control valve adjusts a coolant flow to each of the first injector, the second injector, and the third injector.

As another example, additionally or alternatively, a cooling arrangement of an engine system comprises a coolant pump configured to pump coolant based on a plurality of crank angles of a plurality of cylinders and a first control valve configured to adjust a coolant flow to a second control valve and an expansion tank, wherein the second control valve is configured to adjust coolant flow to a plurality of coolant injectors. Each injector is configured to inject coolant directly at a region of an outer surface of a head of a single cylinder of the plurality of cylinders adjacent to one or more intake valves. In one example, coolant in the cooling arrangement does not flow to a coolant jacket. The coolant pump is the only coolant pump of the cooling arrangement, the coolant pump is configured to pump coolant based on crank angles of crankshafts of the plurality of cylinders.

FIG. 5 shows a schematic depiction of a hybrid vehicle system 106 that can derive propulsion power from engine system 108 and/or an on-board energy storage device. An energy conversion device, such as a generator, may be operated to absorb energy from vehicle motion and/or engine operation, and then convert the absorbed energy to an energy form suitable for storage by the energy storage device.

Engine system 108 may include an engine 110 having a plurality of cylinders 130. Engine 110 may be a non-limiting usage example of the internal combustion engine 2 of FIGS. 1-4 Engine 110 includes an engine intake 123 and an engine exhaust 125. Engine intake 123 includes an air intake throttle 162 fluidly coupled to the engine intake manifold 144 via an intake passage 142. Air may enter intake passage 142 via air filter 152. Engine exhaust 125 includes an exhaust manifold 148 leading to an exhaust passage 135 that routes exhaust gas to the atmosphere. Engine exhaust 125 may include one or more emission control devices 170 mounted in a close-coupled position or in a far underbody position. The one or more emission control devices may include a three-way catalyst, lean NOx trap, diesel particulate filter, oxidation catalyst, etc.

Vehicle system 106 may further include control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 106. As another example, the actuators may include the throttle 162.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 106 comprises multiple sources of torque available to one or more vehicle wheels 159. In other examples, vehicle 106 is a conventional vehicle with only an engine, or an electric vehicle with only electric machine(s). In the example shown, vehicle 106 includes engine 110 and an electric machine 151. Electric machine 151 may be a motor or a motor/generator. A crankshaft of engine 110 and electric machine 151 may be connected via a transmission 154 to vehicle wheels 159 when one or more clutches 156 are engaged. In the depicted example, a first clutch 156 is provided between a crankshaft and the electric machine 151, and a second clutch 156 is provided between electric machine 151 and transmission 154. Controller 112 may send a signal to an actuator of each clutch 156 to engage or disengage the clutch, so as to connect or disconnect crankshaft from electric machine 151 and the components connected thereto, and/or connect or disconnect electric machine 151 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 151 receives electrical power from a traction battery 161 to provide torque to vehicle wheels 159. Electric machine 151 may also be operated as a generator to provide electrical power to charge battery 161, for example during a braking operation.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Figure 6:
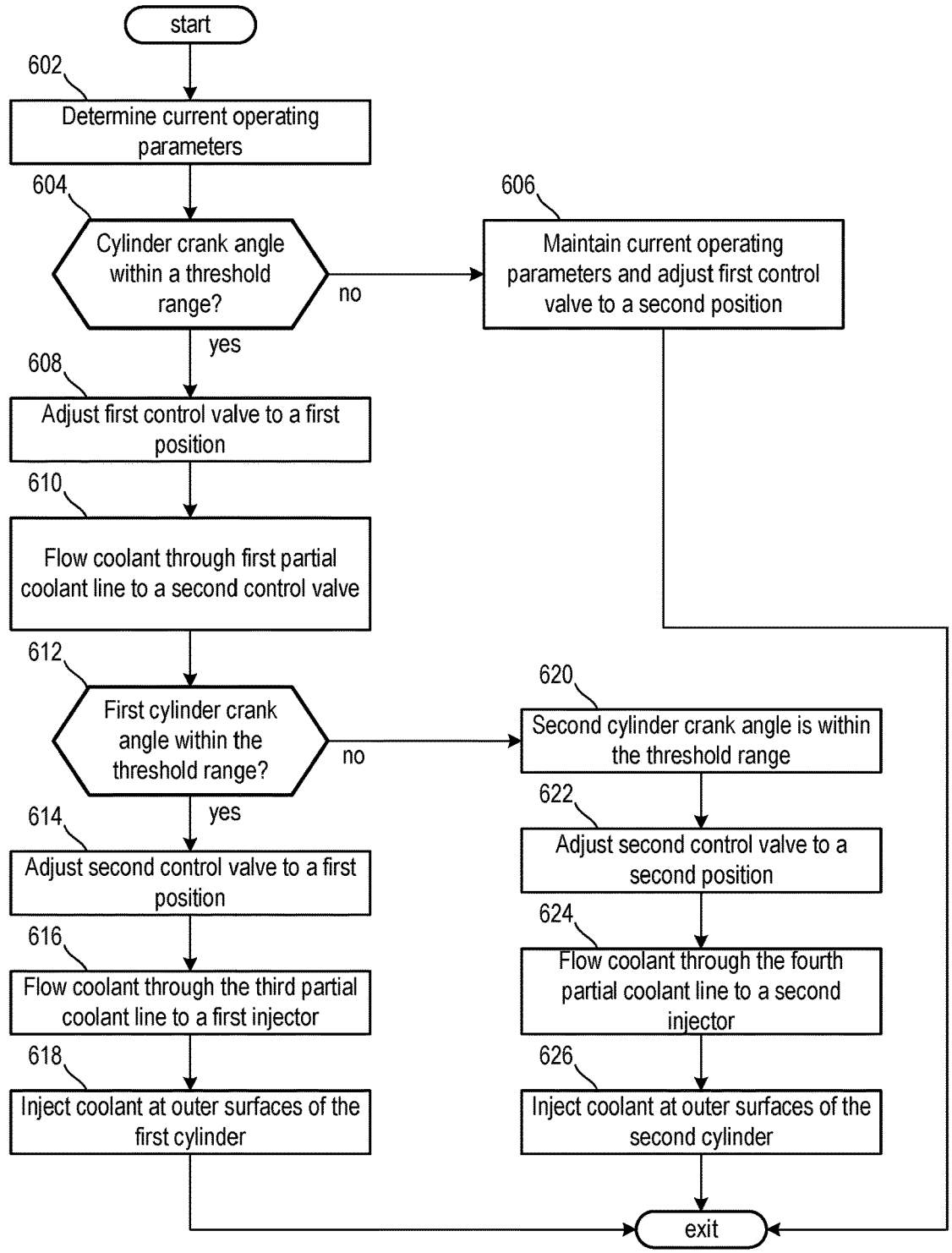
FIG. 6 illustrates a method for operating the cooling system of the present disclosure.

Turning now to FIG. 6, it shows a method 600 for adjusting operation of a cooling system to flow coolant to individual cylinders based on a crank angle of a crankshaft thereof. Instructions for carrying out method 600 may be executed by a controller based on instructions stored on a memory of the controller and in conjunction with signals received from sensors of the engine system, such as the sensors described above with reference to FIG. 5. The controller may employ engine actuators of the engine system to adjust engine operation, according to the methods described below.

The method 600 begins at 602, which includes determining, estimating, and/or measuring one or more current operating parameters. Current operating parameters may include but are not limited to one or more of a manifold vacuum, a throttle position, an engine speed, an engine temperature, a vehicle speed, and an air/fuel ratio.

The method 600 proceeds to 604, which includes determining if a cylinder crank angle is within a threshold range. In one example, the threshold range corresponds to a crank angle where a cylinder temperature may increase a temperature where cooling is desired. In one example, the threshold range includes crank angles between 120 and 240, wherein 180 corresponds to a top-dead center position. Additionally or alternatively, the threshold range may be between 120 to 200 degrees. The cylinder crank angle may correspond to a crank angle of a crankshaft of a cylinder of a plurality of cylinders. If a crank angle of none of the cylinders is within the threshold range, then the method 600 proceeds to 606, which includes maintaining current operating parameters and adjusts a first control valve to a second position. As described above, the second position of the first control valve allow coolant to flow through a second partial coolant line to a degas bottle (e.g., an expansion tank). As such, coolant is not injected onto outer surfaces of a cylinder of any of the plurality of cylinders.

Returning to 604, if at least one cylinder comprises a crankshaft with a crank angle within the threshold range, then cooling is desired and the method 600 proceeds to 608 to adjust the first control valve to a first position.

The method 600 proceeds to 610, which includes flowing coolant through the first partial coolant line to a second control valve. As such, coolant is not directed to the degas bottle and is provided to the second control valve to be distributed to one or more injectors for injecting onto an outer surface of one or more cylinders of the plurality of cylinders.

The method 600 proceeds to 612, which includes determining if a first cylinder crank angle is within the threshold range. If the first cylinder crank angle is within the threshold range, then the method 600 proceeds to 614 to adjust the second control valve to a first position.

The method 600 proceeds to 616, which includes flowing coolant through the third partial coolant line to a first injector.

The method 600 proceeds to 618, which includes injecting coolant at outer surface of the first cylinder. In such an example, only the first cylinder receives coolant due to the second control valve directing coolant to only the third partial coolant line and not to a fourth partial coolant line. As a real-world example, the first cylinder may be undergoing a late compression stroke or early combustion stroke and the second cylinder may be undergoing a late exhaust stroke or early intake stroke.

Returning to 612, if the first cylinder crank angle is not within the threshold range, then the method 600 proceeds to 620, which includes where the second cylinder crank angle is within the threshold range.

The method 600 proceeds to 622, which includes adjusting the second control valve position to a second position.

The method 600 proceeds to 624, which includes flowing coolant through the fourth partial coolant line to a second injector, wherein the second injector is positioned to inject only onto an outer surface of the second cylinder.

The method 600 proceeds to 626, which includes injecting coolant at outer surfaces of the second cylinder. Based on a number of injectors, the outer surface may receive a coolant injection one or more regions of the second cylinder to provide a targeted cooling.

In this way, a cooling system comprises a plurality of injectors equal in number to a plurality of cylinders, wherein an arrangement of control valves is configured to adjust coolant flow to each injector of the plurality of injectors based on a crank angle of each cylinder. The technical effect of basing coolant injections on the crank angle is to provide a targeted cooling to cylinders that demand an increased amount of cooling relative to other cylinders. Furthermore, the cooling arrangement is configured such that more than one cylinder may receive an injection at the same time, wherein the coolant flow to each cylinder is independent of a condition of the other cylinders.

A cooling system of an internal combustion engine comprising at least two cylinders, the cooling system, comprises a coolant line comprising a pump for regulating the flow of a coolant, wherein the pump is in force-fit connection with the crankshaft of the internal combustion engine, and wherein a control valve is configured to adjust a flow of coolant from the pump to a first spray device of a first cylinder or to a second spray device of a second cylinder, wherein the first spray device is configured to spray coolant onto a first cylinder outer wall and the second spray device is configured to spray coolant onto a second cylinder outer wall.

A first example of the cooling system further includes where the control valve is a second control valve downstream of a first control valve relative to a direction of coolant flow, wherein the first control valve is configured to adjust coolant flow to the second control valve or to an expansion tank.

A second example of the cooling system, optionally including the first example, further includes where the first control valve and the second control valve are directional control valves comprising three ports and two switch positions.

A third example of the cooling system, optionally including one or more of the previous examples, further includes where a first partial coolant line fluidly couples the first control valve to the second control valve, and wherein a second partial coolant line fluidly couples the first control valve to the expansion tank.

A fourth example of the cooling system, optionally including one or more of the previous examples, further includes where a first position of the first control valve flows coolant to only the first partial coolant line, wherein a second position of the first control valve flows coolant to only the second partial coolant line.

A fifth example of the cooling system, optionally including one or more of the previous examples, further includes where a third partial coolant line fluidly couples the second control valve to the first spray device and a fourth partial coolant line fluidly couples the second control valve to the second spray device.

A sixth example of the cooling system, optionally including one or more of the previous examples, further includes where a first position of the second control valve flows coolant to only the third partial coolant line, wherein a second position of the second control valve flows coolant to only the fourth partial coolant line.

A seventh example of the cooling system, optionally including one or more of the previous examples, further includes where the first and second directional valves are rotary directional valves.

An eighth example of the cooling system, optionally including one or more of the previous examples, further includes where the cooling system is configured to control coolant flow to only the internal combustion engine.

A ninth example of the cooling system, optionally including one or more of the previous examples, further includes where the first spray device is positioned to spray at a region of the first cylinder outer wall adjacent to a first cylinder intake valve, wherein the second spray device is positioned to spray at a region of the second cylinder outer wall adjacent to a first cylinder intake valve.

A system, comprises an engine comprising a cooling system, wherein the engine and the cooling system are free of coolant jackets, the engine comprising a first cylinder, a second cylinder, and a third cylinder; wherein the cooling system comprises a first injector positioned to inject coolant at a first cylinder outer surface, a second injector positioned to inject coolant at a second cylinder outer surface, and a third cylinder positioned to inject coolant at a third cylinder outer surface.

A first example of the system further includes where the cooling system comprises a coolant pump actuated by and force-fit to a crankshaft of the engine.

A second example of the system, optionally including the first example, further includes where the cooling system comprises a coolant pump actuated by a camshaft coupled to a crankshaft, the coolant pump force-fit to the camshaft.

A third example of the system, optionally including one or more of the previous examples, further includes where the first injector is positioned to inject coolant adjacent to a first cylinder intake valve, wherein the second injector is positioned to inject coolant adjacent to a second cylinder intake valve, and wherein the third injector is positioned to inject coolant adjacent to a third cylinder intake valve.

A fourth example of the system, optionally including one or more of the previous examples, further includes where a multi-way control valve adjusts a coolant flow to each of the first injector, the second injector, and the third injector.

A cooling arrangement of an engine system, comprising a coolant pump configured to pump coolant based on a plurality of crank angles of a plurality of cylinders and a first control valve configured to adjust a coolant flow to a second control valve and an expansion tank, wherein the second control valve is configured to adjust coolant flow to a plurality of coolant injectors.

A first example of the cooling arrangement further includes where each injector is configured to inject coolant directly at a region of an outer surface of a single cylinder of the plurality of cylinders adjacent to one or more intake valves.

A second example of the cooling arrangement, optionally including the first example, further includes where coolant in the cooling arrangement does not flow to a coolant jacket.

A third example of the cooling arrangement, optionally including one or more of the previous examples, further includes where the plurality of cylinders is free of coolant jackets.

A fourth example of the cooling arrangement, optionally including one or more of the previous examples, further includes where the coolant pump is the only coolant pump of the cooling arrangement, the coolant pump is configured to pump coolant based on crank angles of crankshafts of the plurality of cylinders.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A cooling system of an internal combustion engine comprising at least two cylinders, the cooling system, comprising:
 a coolant line comprising a pump for regulating a flow of a coolant, wherein the pump is in force-fit connection with a crankshaft of the internal combustion engine, and wherein a control valve is configured to adjust the flow of coolant from the pump to a first spray device of a first cylinder or to a second spray device of a second cylinder, wherein the first spray device is configured to spray coolant onto a first cylinder outer wall and the second spray device is configured to spray coolant onto a second cylinder outer wall.

2. The cooling system of claim 1, wherein the control valve is a second control valve downstream of a first control valve relative to a direction of the flow of coolant, wherein the first control valve is configured to adjust the flow of coolant to the second control valve or to an expansion tank.

3. The cooling system of claim 2, wherein the first control valve and the second control valve are directional control valves comprising three ports and two switch positions.

4. The cooling system of claim 3, wherein a first partial coolant line fluidly couples the first control valve to the second control valve, and wherein a second partial coolant line fluidly couples the first control valve to the expansion tank.

5. The cooling system of claim 4, wherein a first position of the first control valve flows coolant to only the first partial coolant line, wherein a second position of the first control valve flows coolant to only the second partial coolant line.

6. The cooling system of claim 4, wherein a third partial coolant line fluidly couples the second control valve to the first spray device and a fourth partial coolant line fluidly couples the second control valve to the second spray device.

7. The cooling system of claim 6, wherein a first position of the second control valve flows coolant to only the third partial coolant line, wherein a second position of the second control valve flows coolant to only the fourth partial coolant line.

8. The cooling system of claim 3, wherein the first and second directional valves are rotary directional valves.

9. The cooling system of claim 1, wherein the cooling system is configured to control the flow of coolant to only the internal combustion engine.

10. The cooling system of claim 1, wherein the first spray device is positioned to spray at a region of the first cylinder outer wall adjacent to a first cylinder intake valve, wherein the second spray device is positioned to spray at a region of the second cylinder outer wall adjacent to a first cylinder intake valve.

11. A system, comprising:
an engine comprising a cooling system, wherein the engine and the cooling system are free of coolant jackets, the engine comprising a first cylinder, a second cylinder, and a third cylinder; wherein
the cooling system comprises a first injector positioned to inject coolant at a first cylinder outer surface, a second injector positioned to inject coolant at a second cylinder outer surface, and a third cylinder positioned to inject coolant at a third cylinder outer surface.

12. The system of claim 11, wherein the cooling system comprises a coolant pump actuated by and force-fit to a crankshaft of the engine.

13. The system of claim 11, wherein the cooling system comprises a coolant pump actuated by a camshaft coupled to a crankshaft, the coolant pump force-fit to the camshaft.

14. The system of claim 11, wherein the first injector is positioned to inject coolant adjacent to a first cylinder intake valve, wherein the second injector is positioned to inject coolant adjacent to a second cylinder intake valve, and wherein the third injector is positioned to inject coolant adjacent to a third cylinder intake valve.

15. The system of claim 11, wherein a multi-way control valve adjusts a coolant flow to each of the first injector, the second injector, and the third injector.

16. A cooling arrangement of an engine system, comprising:
a coolant pump configured to pump coolant based on a plurality of crank angles of a plurality of cylinders; and
a first control valve configured to adjust a coolant flow to a second control valve and an expansion tank, wherein the second control valve is configured to adjust coolant flow to a plurality of coolant injectors.

17. The cooling arrangement of claim 16, wherein each injector is configured to inject coolant directly at a region of an outer surface of a single cylinder of the plurality of cylinders adjacent to one or more intake valves.

18. The cooling arrangement of claim 16, wherein coolant in the cooling arrangement does not flow to a coolant jacket.

19. The cooling arrangement of claim 16, wherein the plurality of cylinders is free of coolant jackets.

20. The cooling arrangement of claim 16, wherein the coolant pump is the only coolant pump of the cooling arrangement, the coolant pump is configured to pump coolant based on crank angles of crankshafts of the plurality of cylinders.

* * * * *